Patented Nov. 14, 1939

2,179,979

UNITED STATES PATENT OFFICE 2,179,979

α - NAPHTHACETYL - AMINO ACIDS AND PROCESS FOR THE MANUFACTURE OF SAME

Otto Isler, Basel, Switzerland, assignor to Hoffman-La Roche Inc., Nutley, N. J., a corporation of New Jersey No Drawing. Application January 13, 1939, Serial No. 250,845. In Switzerland February 2, 1938

12 Claims. (Cl. 260—518)

It has been found that the salts of α-naphthacetyl-amino acids under suitable conditions stimulate the striking of roots from cuttings, the formation of adventitious roots and of shoots, as well as the growth of roots. Moreover, they have proved to be excellent dissolving agents.

The manufacture of α-naphthacetyl-amino acids is effected by causing α-naphthyl-acetic acid halides to act on aliphatic amino acids.

The new compounds are to be used as preparations for promoting the growth of plants and as dissolving agents.

Example 1

113 parts by weight of α-naphthyl-acetyl chloride, prepared from 100 parts by weight of α-naphthyl-acetic acid by means of thionyl chloride, are added dropwise to a solution of 50 parts by weight of glycocoll in 500 parts by weight of 3-n soda solution while stirring. The clear solution is diluted with 1000 parts by weight of water and then acidified by the addition of 3-n hydrochloric acid. Thereby, the α-naphthacetyl glycine separates as a voluminous white precipitate which is sucked off, dried, digested twice with 2000 parts by weight of ether and then recrystallised from 25 parts by weight of 30% alcohol. The α-naphthacetyl glycine melts at 153–154° C. It forms alkali salts easily soluble in water.

Example 2

42 parts by weight of α-naphthyl-acetyl chloride are added dropwise to an alkaline solution of 28 parts by weight of l-leucin in the course of one hour while stirring vigorously. After three hours the product is acidified, the condensation product sucked off, again dissolved in a solution of caustic soda and precipitated once more with hydrochloric acid. The precipitate is then sucked off, dried and twice recrystallised from benzene. The α-naphthacetyl-l-leucin melts at 146–147° C. It forms alkali salts easily soluble in water.

Example 3

6 parts by weight of α-naphthyl-acetyl chloride are condensed in alkaline solution with 4 parts by weight of sarcosine. The scarcely soluble sodium salt of α-naphthacetyl sarcosine is precipitated during the reaction. The product is left to stand in a refrigerator overnight and the sodium salt filtered off, suspended in a large volume of water and precipitated with hydrochloric acid. The α-naphthacetyl sarcosine is digested with ether and recrystallised from 30% acetic acid. It melts at 147–148° C.

I claim:

1. Compounds of the general formula

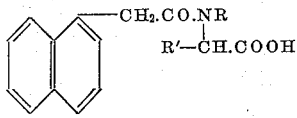

wherein R and R' are selected from the group comprising hydrogen and alkyl radicals.

2. α-Naphthacetyl glycine.
3. α-Naphthacetyl leucin.
4. α-Naphthacetyl sarcosine.
5. Process for the manufacture of α-naphthacetyl-amino acids of the general formula

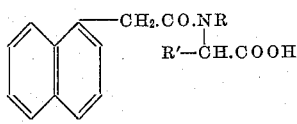

wherein R and R' represent an aliphatic alkyl or hydrogen, comprising reacting an α-naphthyl-acetic acid halide with amino acids.

6. Process for the manufacture of α-naphthacetyl-amino acids of the general formula

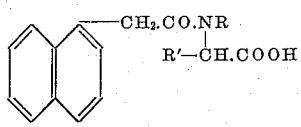

wherein R and R' represent an aliphatic alkyl or hydrogen, comprising reacting an α-naphthyl-acetic acid halide with amino acids in alkaline solution.

7. Process for the manufacture of α-naphthacetyl glycine comprising the reaction of α-naphthyl-acetic acid chloride with glycocoll.

8. Process for the manufacture of α-naphthacetyl glycine comprising the reaction of α-naphthyl-acetic acid chloride with glycocoll in alkaline solution.

9. Process for the manufacture of α-naphthacetyl-l-leucin comprising the reaction of α-naphthyl-acetic acid chloride with l-leucin.

10. Process for the manufacture of α-naphthacetyl-l-leucin comprising the reaction of α-naphthyl-acetic acid chloride with l-leucin in alkaline solution.

11. Process for the manufacture of α-naphthacetyl sarcosine comprising the reaction of α-naphthyl-acetic acid chloride with sarcosine.

12. Process for the manufacture of α-naphthacetyl sarcosine comprising the reaction of α-naphthyl-acetic acid chloride with sarcosine in alkaline solution.

OTTO ISLER.